(12) United States Patent
Ali

(10) Patent No.: US 10,029,435 B2
(45) Date of Patent: Jul. 24, 2018

(54) MICROWAVE PRESS EXTRACTION APPARATUS

(71) Applicants: Idris Ahmed Ali, Dubai (AE); Al Ghurair University, Dubai (AE)

(72) Inventor: Idris Ahmed Ali, Dubai (AE)

(73) Assignees: Idris Ahmed Ali (AE); Al Ghurair University (AE)

( * ) Notice: Subject to any disclaimer, the term of this patent is extended or adjusted under 35 U.S.C. 154(b) by 855 days.

(21) Appl. No.: 14/602,354

(22) Filed: Jan. 22, 2015

(65) Prior Publication Data
US 2016/0213052 A1 Jul. 28, 2016

(51) Int. Cl.
| | |
|---|---|
| *B30B 15/34* | (2006.01) |
| *H05B 6/80* | (2006.01) |
| *H05B 6/70* | (2006.01) |
| *H05B 6/64* | (2006.01) |
| *B30B 9/06* | (2006.01) |
| *A23L 2/04* | (2006.01) |
| *A23N 1/00* | (2006.01) |
| *H05B 6/76* | (2006.01) |
| *A23L 2/10* | (2006.01) |

(52) U.S. Cl.
CPC ............... *B30B 15/34* (2013.01); *A23L 2/04* (2013.01); *A23L 2/107* (2013.01); *A23N 1/00* (2013.01); *A23N 1/006* (2013.01); *B30B 9/06* (2013.01); *H05B 6/6402* (2013.01); *H05B 6/707* (2013.01); *H05B 6/766* (2013.01); *H05B 6/80* (2013.01); *H05B 2206/044* (2013.01)

(58) Field of Classification Search
CPC .................................. B30B 15/34; A23L 2/04
See application file for complete search history.

(56) References Cited

U.S. PATENT DOCUMENTS

| | | | | |
|---|---|---|---|---|
| 5,932,273 A | * | 8/1999 | Yasui | A23G 3/346 426/576 |
| 6,287,410 B1 | * | 9/2001 | Klemarewski | B27D 3/04 156/273.7 |
| 6,468,565 B1 | * | 10/2002 | Anno | A23L 27/105 426/49 |
| 7,048,825 B2 | * | 5/2006 | Churchland | B27N 3/18 156/272.2 |
| 7,562,540 B2 | * | 7/2009 | Hu | C03B 37/02 264/211.1 |

(Continued)

*Primary Examiner* — Sean Michalski
(74) *Attorney, Agent, or Firm* — Hayes Soloway PC

(57) ABSTRACT

A press apparatus comprising a microwave energy source, a resonator cavity to receive microwave energy from the microwave energy source and to resonate the microwave energy within the resonator cavity, the resonator cavity having a peripheral side, a top side and a bottom side, a food container for receiving food from which juice is extracted, the container adapted to be located within the resonator cavity for heating the food using the microwave energy, the food container having a peripheral side, a top side and a bottom side, a plunger to press the food inside the food container, a press mechanism located outside the resonator cavity and in force communication with the plunger for exerting mechanical pressure on the food inside the food container during the heating operation for extracting the juice; and a juice collector located outside the resonator cavity in fluid communication with the container for collecting the juice.

20 Claims, 6 Drawing Sheets

(56) References Cited

U.S. PATENT DOCUMENTS

| | | | | |
|---|---|---|---|---|
| 8,249,946 B2* | 8/2012 | Froseth | ............... | G06Q 10/08 |
| | | | | 416/72 |
| 8,540,924 B2* | 9/2013 | Hoffman | ............... | B27N 3/18 |
| | | | | 219/388 |
| 8,858,210 B2* | 10/2014 | Szymczak | ............ | A61K 9/0056 |
| | | | | 264/449 |
| 9,493,298 B2* | 11/2016 | Evans | ................. | B65D 77/04 |
| 2005/0238865 A1* | 10/2005 | Konishi | ................. | B32B 5/26 |
| | | | | 428/292.1 |
| 2006/0083835 A1* | 4/2006 | Raghavan | ............... | A23L 2/02 |
| | | | | 426/521 |
| 2015/0342244 A1* | 12/2015 | Fouquet | ................. | A23N 1/02 |
| | | | | 426/489 |

* cited by examiner

MICROWAVE PRESS EXTRACTION APPARATUS

FIELD OF THE INVENTION

The present invention relates generally to a press apparatus and more particularly to a microwave based extraction apparatus and method for extraction of juice from food such as vegetables, plants and fruits.

BACKGROUND OF THE INVENTION

There are, in general two main techniques used to extract date juice from fresh dates. One of them is an old traditional technique and the other is relatively new hot extraction technique. The traditional method of extraction is a local method used since ancient times in the Middle East for extraction of date-juice, locally known as 'Dibs'. In this technique, dates are packed in plastic containers and piled in parallel rows on wood strips in a tightly closed room, which is never opened during the extraction period that extends over two weeks or more. Pressure exerted by date piles, together with the warm room condition, cause extraction of thick date-juice which is collected through a small opening, at the bottom of one side of the room. The yield never exceeds about 10%, and it is used mainly for local consumption. This technique, suffers from many drawbacks such as long extraction time, extending over two weeks or even a month, sanitary conditions are not preserved, as fresh dates and the extracted juice could be subjected to unavoidable dust and insects that might migrate to the closed room, the produced juice is dark and turbid, and the yield is very low (less than 10%).

In the new hot extraction technique a predetermined amount of date is mixed with a certain amount of water (approximately 2.5 water to 1.0 dates), and cooked, in pressure cookers or open pans, then press filtered by a hydraulic press filter, to separate liquid juice from remaining solids. Thin juice thus obtained, is concentrated by evaporating excess water, in open pans. Yield can reach over 70% in this technique, and large quantities of juice can be produced. However, there are some drawbacks to this technique that can be summarized as follows:

a) Use of traditional energy sources, such as gas or coal, in which heat is transferred through the food by conduction. In this case, a substantial amount of heat energy is expended in heating up the pans and the surrounding environment.

b) Using open pans and transferring the boiling mixture from these pans to the press filter could cause hazardous conditions for working personnel c) No means for controlling and efficient use of the available energy d) Long extraction time, due to factor (a) above, in which the rate of heating depends on the thermal conductivity of the date-water mixture.

In an effort to speed-up date-syrup extraction process by both the traditional and hot extraction methods, the inventor of the present invention has used microwave heating instead of traditional heating by conduction, for extraction of date juice from fresh dates, using a domestic microwave oven for both extraction and concentration. The results show that using microwaves gave a product superior to those produced by traditional heating in terms of colour and purity of the final product and there is a speeding-up of both extraction and concentration process.

FIG. 1 shows an initial embodiment of a microwave press apparatus already part of the prior art. This apparatus consists of a locally assembled microwave power source (G) comprised of a high power source (S), a magnetron (M), a rectangular waveguide (W) with tunable mechanism for aperture coupling of microwave energy to a microwave-transparent container (C) of fresh dates, seated inside a resonator cavity with adjustable height (R), for press extraction of date-juice, while fresh dates are exposed to microwave heating. The cavity (R) is fed at its bottom end with microwaves guided through an aperture drilled at the center of a detachable lower plate (D).

Although this extraction apparatus gave far superior performance compared to the traditional method for production of date juice from fresh dates, it had a number of disadvantages and limitations, which can be summarized in the following:

i. Microwave power is fed through an aperture of a detachable plate (D), at the bottom of the resonator (R), which makes it difficult in assembling and de-assembling of the apparatus. In addition, any accidental leakage of the extracted juice through the lower bottom end of the resonator could readily be directed through the feeding waveguide thus disrupting microwave passage and cause partial reflection of microwave energy.

ii. The only way of insertion and removal of the fresh date container (C) is through the bottom end of the apparatus, after removing the microwave power feeding assembly and the detachable bottom plate, which is slow, cumbersome and awkward method.

iii. The pressure application mechanism is manually operated for both application and release of pressure (by turning a threaded circular plate clockwise and anti-clock-wise respectively).

iv. The extracted juice remains in the lower conical part of the container (C), thus being exposed to further microwave heating before being drained out. This is not desirable as the extracted juice is already concentrated and does not need any further heating.

v. The support system for the apparatus, composed of four rods and two detachable square plates, had to be de-assembled after each extraction cycle and re-assembled again to start a new extraction cycle.

SUMMARY OF THE INVENTION

The present invention aims to overcome the above mentioned limitations and other problems associated with this prior art press device.

According to the present invention, the microwave power is fed to the resonator cavity through the side walls (peripheral wall) instead of the detachable plate at the bottom end, thus making microwave feeding system more secure and permanently attached to the resonator cavity unit.

A flexible door is added to the apparatus, for easy insertion and removal of the food container inside and outside the resonator cavity.

Pressure application/release mechanism is proposed by adding a spring, which causes self-release of pressure after manual application of pressure. Also, an automatic press mechanism can be used using electrical energy for example.

A permanent enclosure is proposed to encompass all components of the press apparatus.

The extracted juice is collected at the lower end of the apparatus (inside the juice collector) outside the resonator cavity and the container which are exposed to microwave heating, thus avoiding any further heating of the extracted juice.

Accordingly, it is an object of the present invention to provide a microwave press extraction apparatus for extraction of liquids from any liquid-containing foods, such as date-juice from fresh date fruits, which utilizes mechanical pressure during or just after microwave heating, for fast and efficient extraction of the liquid, in the same unit.

It is another object of the invention to provide a microwave press extraction apparatus that can be easily assembled and manufactured using commercially available materials, said materials being carefully chosen for electrical, thermal and mechanical points of view to give optimum operating conditions, and hence better yield.

It is another object of the invention to provide a microwave press extraction apparatus, which has a tuning mechanism for efficient utilization of microwave power.

It is another object of the invention to provide a microwave press extraction apparatus with minimum cost, which can be easily used by an ordinary unskilled person.

It is another object of the invention to provide a microwave press extraction apparatus, which can be easily cleaned and sterilized and which can preserve electrical and sanitary properties over a long working period of time.

In accordance with this invention, the apparatus comprises a microwave source composed of power supply and a magnetron, a waveguide that transfers microwave energy from the source to a resonator cavity, through a coupling aperture, and a press filter unit composed of a container-filter that is adapted to be mounted inside the resonator cavity; an external press mechanism, and a support structure. The resonator cavity walls are made from a highly conductive material to keep microwave losses to the minimum. The press filter unit is made from special material that has certain electrical physical and thermal properties. Electrically, it is transparent to microwaves, so that microwave energy can easily penetrate it to be absorbed inside the food to be processed. Thermally, it is non-conductive, with high specific heat, so that it can withstand the high temperature, which may result from heating the food inside. Physically, it should be strong enough to withstand, without distortion, the relatively high pressure to be exerted manually, or hydraulically, using the press mechanism for extraction of date-juice or similar products. The container of the press/filter unit is made of two sections; an upper section of cylindrical shape with an upper sliding plunger and a perforated lower end for accommodation of food to be processed, a lower section of outer cylindrical shape and inner conical shape used to pass juice to the juice collecting container (juice collector) placed just below the container but outside the resonator cavity. Though the shape of the container is preferably cylindrical, the container can also have other shapes such as rectangular or other. Means can be easily provided for cavity tuning for maximum power transfer as well as means for monitoring reflected power and temperature rise during microwave heating.

As a first aspect of the invention, there is provided a press apparatus comprising:
  a microwave energy source;
  a resonator cavity adapted to receive microwave energy from the microwave energy source and to resonate the microwave energy within the resonator cavity, the resonator cavity having a peripheral side, a top side and a bottom side;
  a food container for receiving food from which juice is to be extracted, the container being adapted to be located within the resonator cavity for heating the food using the microwave energy, the food container having a peripheral side, a top side and a bottom side;
  a plunger adapted to press the food inside the food container;
  a press mechanism adapted to be located outside the resonator cavity and to be in force communication with the plunger for exerting mechanical pressure on the food inside the food container during the heating operation for extracting the juice; and
  a juice collector adapted to be located outside the resonator cavity in fluid communication with the container for collecting the juice.

Preferably, the press apparatus further comprises at least one waveguide adapted to be connected to the microwave energy source and to the peripheral wall of the resonator cavity for guiding microwaves from the microwave energy source to the resonator cavity for heating the food.

Preferably, the peripheral side of the cavity comprises a peripheral wall and a door for allowing insertion and removal of the food container inside and outside the resonator cavity respectively.

Preferably, at least a part of the door is made of transparent material and a matrix of conductive material for allowing viewing the food inside the container all in preventing the microwave energy from leaking outside the resonator cavity.

Preferably, the press apparatus further comprises an external enclosure adapted to enclose the microwave energy source, the resonator cavity, the food container and the juice collector.

Preferably, the resonator cavity is made of a highly conductive material for reflecting the microwave energy and keeping it inside the resonator cavity.

Preferably, the container is made of a material having suitable electrical, mechanical and thermal properties for allowing penetration of the microwave energy from the resonator cavity inside the food container for heating the food, for withstanding without distortion the mechanical pressure exerted on the food by the plunger, and for withstanding without distortion the heat generated inside the container by the microwave energy.

Preferably, the container food comprises ceramic or polyetherimides with reinforced glass fibre.

Preferably, the press mechanism comprises a rod adapted to be connected to the plunger for enabling the force communication thereto.

Preferably, the press mechanism further comprises a spring in force communication with the plunger for allowing self-release of the pressure exerted on the food.

Preferably, the press mechanism further comprises a first hollow cylinder having a first cylinder axis, a closed top and an open bottom, a second hollow cylinder having a second cylinder axis, an open top and an open bottom adapted to slide within the first hollow cylinder along the first and second cylinder axis, the open bottom of the first cylinder and the open top of the second cylinder forming concentric openings, wherein the spring is adapted to enclose the rod, and wherein the rod and the spring are both adapted to extend longitudinally within the concentric openings of the first and second cylinders along the first and second cylinder axis and to have one end secured to the closed top of the first hollow cylinder.

Preferably, the top sides of the resonator cavity and of the food container have concentric openings adapted to allow passage of the rod inside the food container through the resonator cavity.

Preferably, the open bottom of the second hollow cylinder is adapted to be secured to the top side of the resonator cavity.

Preferably, the food container comprises an upper section adapted for receiving the food and a lower section adapted to canalize the extracted juice towards the juice collector, wherein the container upper section comprises a perforated lower end in fluid communication with the container lower section and wherein the container lower section is in fluid communication with the juice collector.

Preferably, the perforated lower end is a removable perforated plate.

Preferably, the container lower section comprises a conical portion in fluid communication with the container upper section and the juice collector for canalizing the juice from the container upper section to the juice collector.

Preferably, the container further comprises a perforated base adapted to be mechanically connected to the container lower section and adapted to stand on the resonator cavity bottom side, the base being in fluid communication with the container lower section and the juice collector for communicating the juice from the container lower section to the juice collector.

Preferably, the peripheral wall of the container is cylindrical.

Preferably, the food from which juice is to be extracted comprises at least one of vegetables and fruits.

Preferably, the food from which juice is to be extracted is dates.

DETAILED DESCRIPTION OF THE INVENTION

Figure 1:
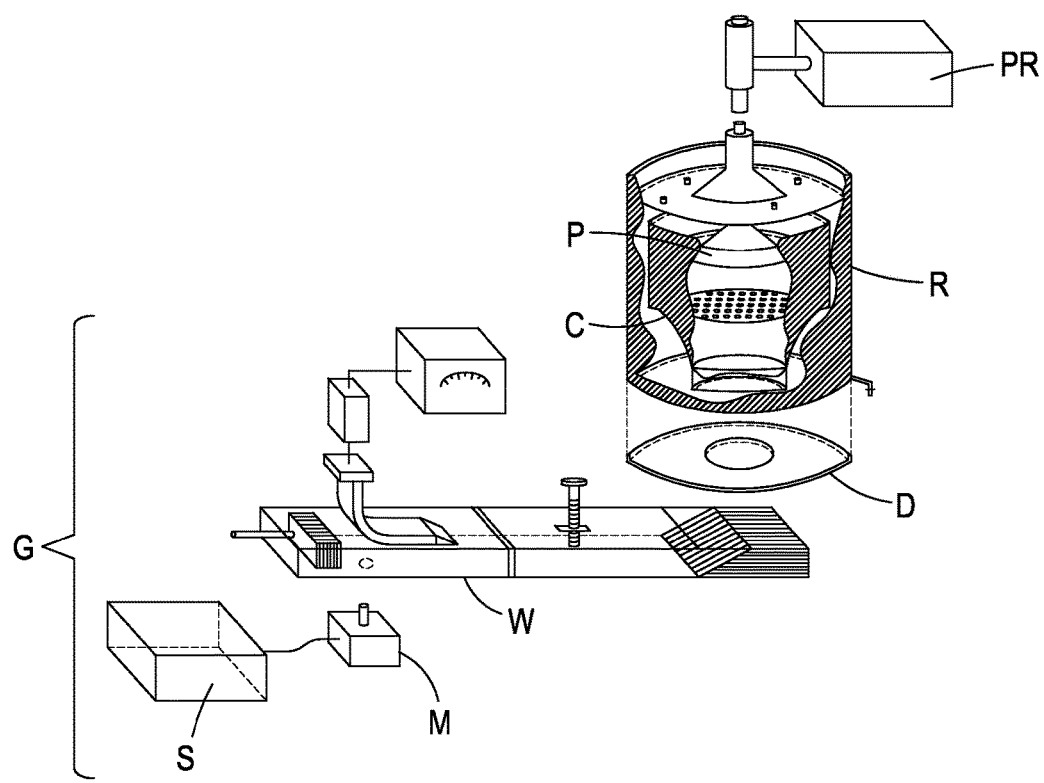
FIG. 1 is a pictorial view of the main components of the microwave apparatus of prior art.
Figure 2:
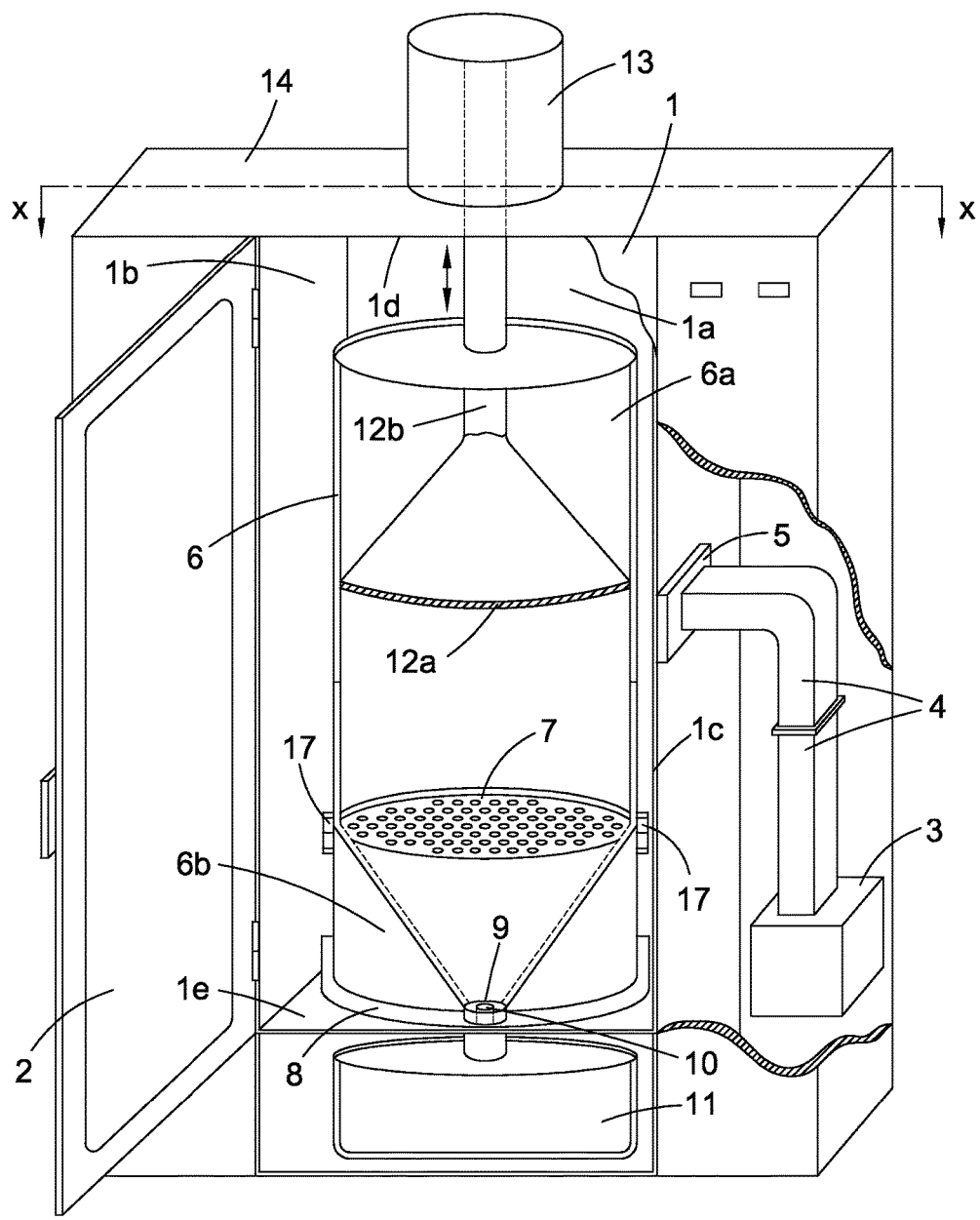
FIG. 2 is a perspective view of the partially cut microwave press extraction apparatus and method of the present invention.

FIG. 2 shows a perspective view of the microwave press extraction apparatus according to a preferred embodiment of the present invention. It comprises the following main components, which will further be detailed in the following paragraphs; a resonator cavity (1), which could take any of the standard forms, rectangular or circular, a microwave energy source (3), a container (6) that is adapted to receive food to be processed, a final processed liquid (juice) container or collector (11), a press mechanism (13) for application of mechanical pressure on the food to be processed, and an external enclosure (14).

The resonator cavity (1), in a preferred embodiment of the present invention, has a rectangular shape with three fixed sides (1a, 1b, 1c) a fixed top (1d) and bottom (1e) walls and a front door (2). The resonator cavity walls (1a, 1b, 1c, 1d, 1e) can be made from a highly conductive material, such as copper, brass or aluminium, to keep microwave power losses to the minimum. The top wall (1d) has a circular hole at its centre to allow passage of the circular rod (12b) of the press mechanism, described later, while the bottom wall (1e) contains a concentric circular hole (10) of smaller diameter, to allow passage of hollow pipe (9) that carries processed juice outside the resonator cavity (1). The front door (2) of the food container (6) is made of a transparent material, such as reinforced glass for viewing the inside food container, and a matrix of conductive material to prevent microwave energy leakage to the outer environment of the resonator cavity.

The microwave energy source (3) can be configured to provide power to the resonator cavity (1). The frequency can be set at any frequency within industrially approved range (ISM frequencies) e.g. 915 MHz or 2,450 MHz. It can optionally be set to 2,450 MHz, the frequency commonly used for commercial microwave ovens. Energy from energy source (3) can be directed to the resonator (1) by means of the waveguide (4). The waveguide (4) can be any of the standard S-band waveguides (e. g. WR 340), made of high conductive material such as aluminium or brass.

The waveguide (4) can be connected to the resonator cavity (1) by a coupling aperture (5) in such a way that it forms a tight seal, such as fastening of the flanged end (4c) of the waveguide (4) to the resonator cavity (1) by means of a fastener. The coupling aperture (5) acts as an impedance transformer between waveguide (4) and the applicator resonator cavity (3). It must match the impedance of the resonator cavity (1) with that of the waveguide (3). The design of the coupling aperture (5) may take the form of a simple rectangular hole as shown in FIG. 2.

The microwave energy source (3) can be locally assembled or can be a commercially available microwave generator, provided by many microwave equipment vendors, such as Richardson Electronics, which is already equipped with all necessary accessories, such as power level control and tuning mechanism.

Figure 3:
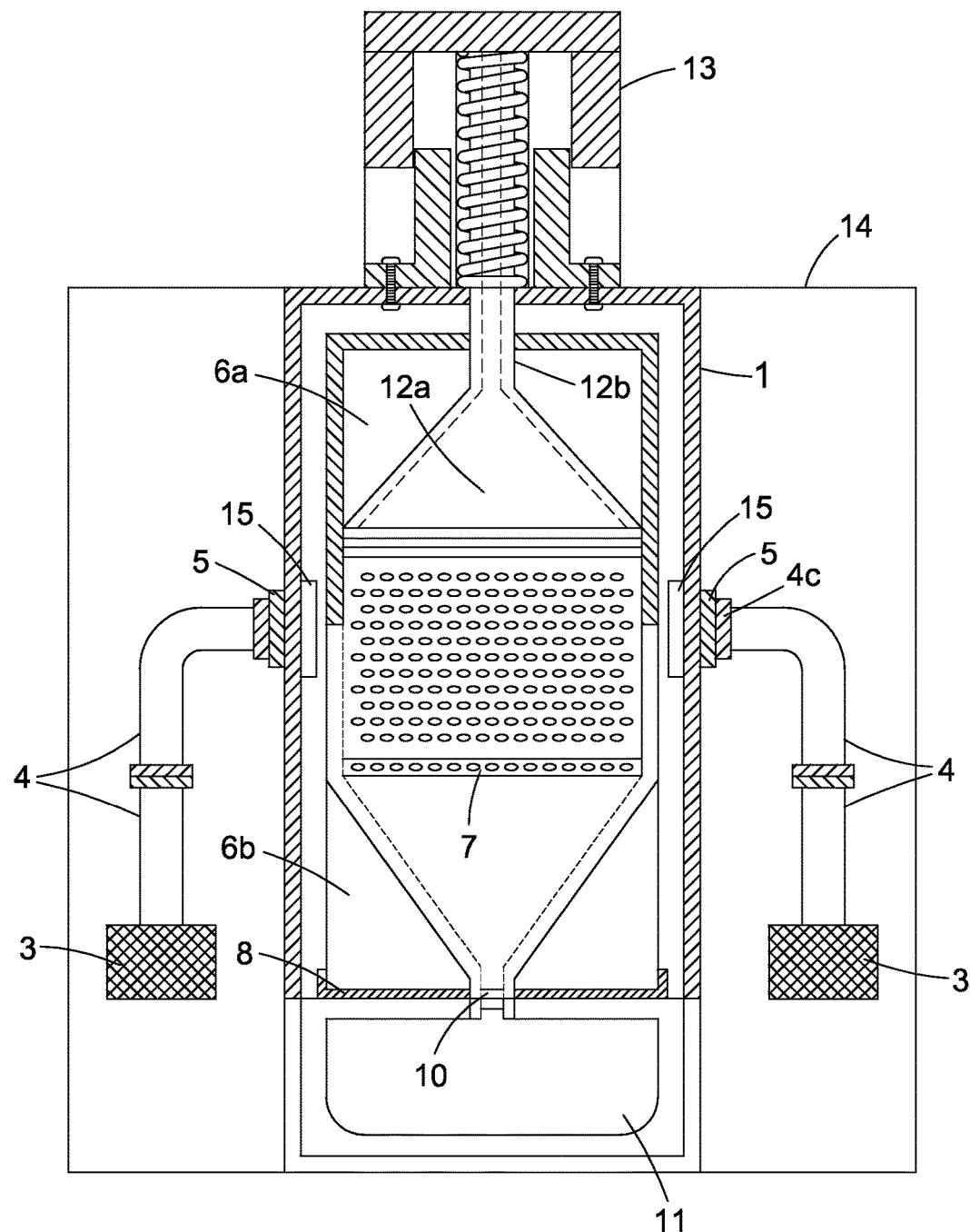
FIG. 3 is an elevation view of the main portion of the microwave apparatus and method of the present invention taken at x-x of FIG. 2.

FIG. 3 which shows a vertical sectional view of the microwave press extraction apparatus, gives more inside details of the main components of the apparatus with two microwave energy sources (3) connected through two coupling apertures (5) to two opposite sides (1b, 1c) of the resonator cavity (1). Each of the two apertures (5) which feed microwave energy to the inside of the cavity resonator (1) is covered by a square box (15) which encloses energy stirrer in the form of bladed fan-like device fed at the top wall (or sometimes side or bottom wall). The main function of the energy stirrer is to disperse the undesirable standing wave patterns, thus contributing to more even distribution of microwave energy inside the resonator cavity (1).

Figure 4:
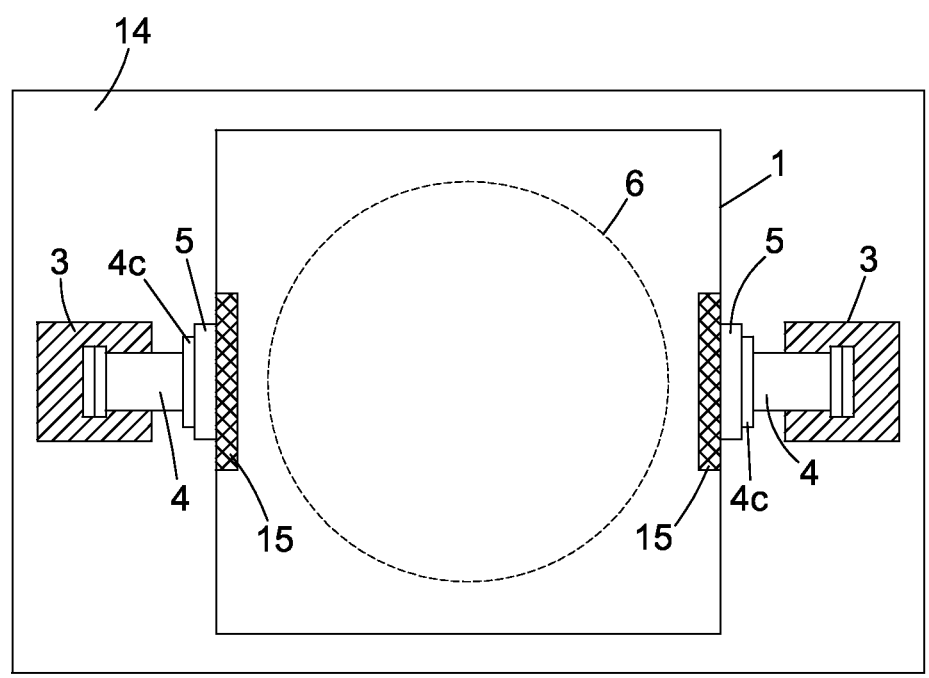
FIG. 4 is a top view of the microwave apparatus and method of the microwave press extraction apparatus of FIG. 2.

FIG. 3 together with FIG. 4, which shows the top view of the microwave press apparatus, illustrates the relative position of all the microwave press extraction apparatus within the external enclosure (14). It all sheds some light on the interior components of the mechanical press/filter unit, which is given in more details in FIG. 5.

Figure 5:
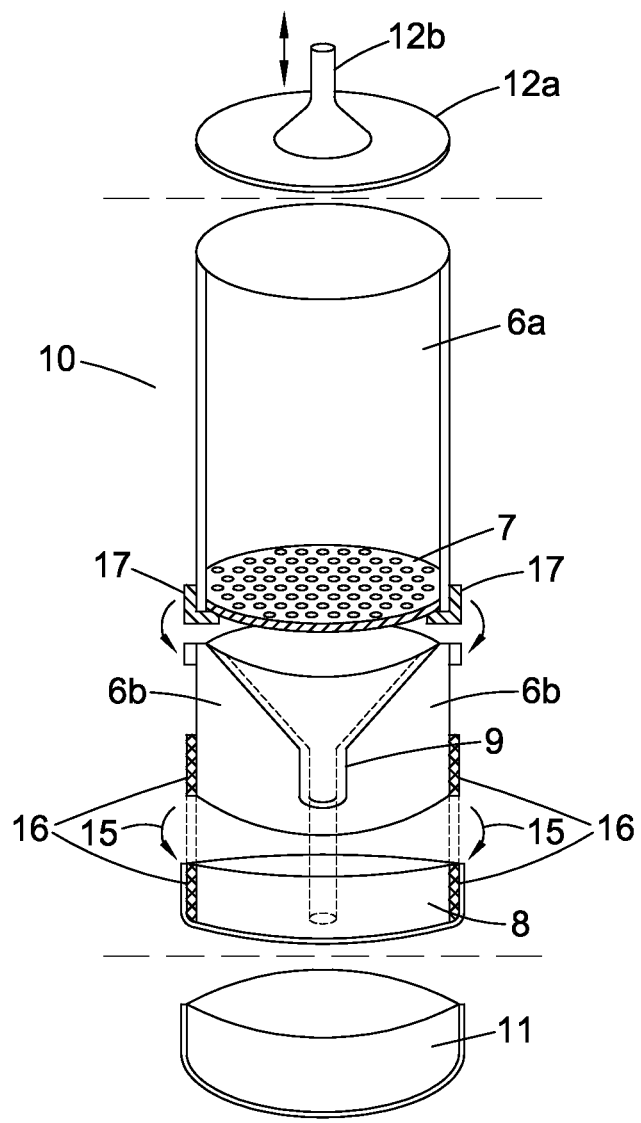
FIG. 5 is an exploded view of the container of the food to be processed according to the present invention.

FIG. 5 shows an exploded view of the food container (6) that contains the food to be processed, and shows how the different components of the container (6) are assembled.

The food container (6) comprises two separate main sections (6a) and (6b). The upper section (6a) is preferably of cylindrical shape, with open upper end and a perforated lower end (7), for accommodation of the food to be processed. The lower section (6b) has preferably an external cylindrical shape and internal conical shape to pass the processed liquid (juice) through a hollow pipe (9) to the juice container or collector (11) placed below the food container (6), outside the resonator cavity (1). The food container (6) is made from special material that has certain electrical, physical and thermal properties. Electrically, it is transparent to microwaves so as to allow penetration of microwave energy to the inside food to be processed. Physically it is strong enough to withstand, without distortion, the relatively high mechanical pressure to be exerted on the food to be processed. Thermally, it is nonconductive, with high heat capacity so as to withstand the high generated temperature. Such materials include ceramic materials, which are strong and rigid and at the same time, microwave transparent. They could also, be polyetherimides, such as ULTEM® reinforced by continuous glass fiber or any other such microwave non-absorbent material. The components of the experimental unit (filter, plunger, moving shaft) can be fabricated from reinforced P.V.C, with loss factor, $\epsilon''<0.002$.

FIG. 5 shows an exploded view of the food container (6), with its main components disassembled. For practical use of the present apparatus for date-juice extraction, the main components of the container (6) are assembled as follows:

The base (8), which holds the food container (6) in-place during juice extraction, is first securely fastened to the bottom end (1e) of the resonator cavity (1). The lower section (6b) is placed on top of the base (8), and is securely fastened to the base (8) by screwing through the threads (16) grooved in on the outer wall of the lower section (6b) of the food container (6) and the inner side walls of the base (8). Other suitable means for securely fastening the section (6b) to the base (8) can also be used. The upper section (6a) is first filled with food to be processed, and is securely fastened to the lower section (6b) of the container (6), using quick release latches (17) to prevent any unintended movement or separation of the two section (6a) and (6b) of the food container (6). The plunger (12a) is slowly lowered until it is completely inserted inside the upper section (6a) of the container (6) until it comes in contact with the upper surface of the food to be processed. Plunger (12a) is connected to the cylindrical rod (12b) with the flared end securely fastened to the upper surface of the plunger (12a) and the cylindrical rod (12b) is in-turn connected to the press mechanism (13) as illustrated in FIG. 2.

Figure 6:
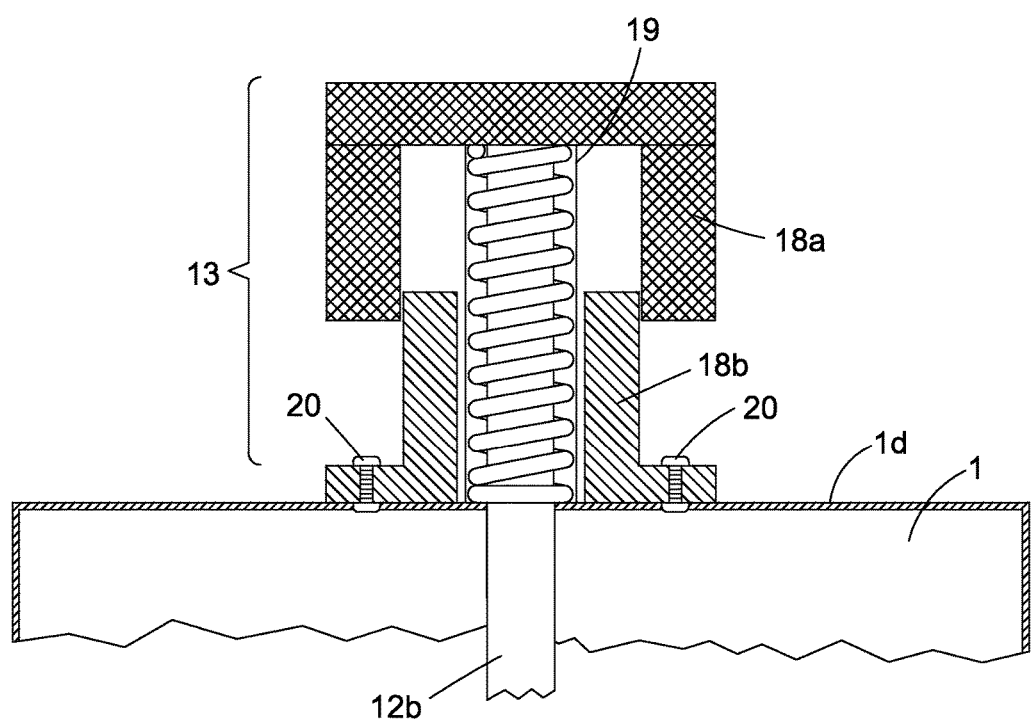
FIG. 6 is an expanded view of the press mechanism used according to the present invention.

FIG. 6 shows an expanded view of the pressure exertion (press) mechanism (13). It comprises two hollows cylinders (18a) and (18b) which smoothly slide in each other when the pressure exertion mechanism (12) is in operation. The upper cylinder (18a) has a closed top end and an open bottom end. The lower cylinder (18b) is open at its both ends, with one end (bottom end in FIG. 6) flared-out to come in contact with, and fastened to, the top wall (1d) of the upper cylinder (6a) of the container (6), with the two screws (20). A spring (19) is securely fastened to the bottom surface of the top side of the upper cylinder (18a) of the pressure exertion mechanism (13). The rod (12b) passes through the inner side of the spring (19) and is also securely fastened to the bottom surface of the upper cylinder (18a).

The main function of the spring (19) in the pressure exertion mechanism (13) is to restore the rod (12b), and consequently the plunger (12a) to its initial position, after releasing the mechanical pressure exerted on the top surface of the top cylinder (18a) when the pressure exertion mechanism (13) is in operation. Although it is preferable to mold the press/filter as one unit, it is advisable from practical point of view, to mold the two sections (12a) and (12b) separately. This is preferable for easy dismantling the apparatus for cleaning after use, and in-between different extraction cycles.

In one embodiment of the invention, there is provided a temperature and/or humidity regulator to regulate the extraction process. For example, a temperature probe located at an appropriate point(s), preferably at the center of the food being processed, could be used to reduce power level, or even switch off the microwave source, when temperature reaches a predetermined level.

Practical Utilization of the Apparatus

As an example of use, the present apparatus can be used for extraction of dates juice as follows:

The solid food (e.g. dates) to be processed is loaded in the food container (6). The solid food is retained above the perforated grid (7). The container (6) with its solid food is placed inside the resonator cavity (1) through the door (2). The pressing plunger (12a) is lowered and inserted inside the container (6), through its upper opening. The door (2) is sealed closed in such a way that microwave leakage is completely prevented when the apparatus is in operation mode. The power source (3) is switched on to start heating-up the solid food. The microwaves then setup a standing-wave pattern inside the resonator cavity (1), and irradiate the product (fresh dates in this case) which is placed inside food container (6) just on the top of the perforated plate (7). The interaction of the food with the incoming waves elevates the product temperature due to microwave absorption. Temperature readings could be taken, using an infrared thermometer that does not interact with microwaves such as Raynger ST6 non-contact thermometer. Temperature probes could be placed at selected points inside the dates sample, such as the center point, and two other points, one at the uppermost position, and the other at the lowest position in the sample. The actual level of temperature depends on the amount of microwave energy absorbed, which in turn, depends on a number of factors such as the (a) amount of food to be processed, (b) the dielectric loss factor of the food (dates), which in turn depends strongly on food's moisture content, (c) the electric field intensity inside the food and (d) the irradiation period. The absolute value of temperature inversely depends on the amount of food to be processed, and directly on the dielectric loss factor of the food, the electric field and the irradiation period. For a given amount and type of dates, heated for a certain period of time, factors (a), (b) and (d) are constants and only the third one (c) determine power absorbed and hence power coupled into the resonator cavity (1).

Mechanical pressure is exerted on the solid food by the press mechanism (13), either intermittently or continuously while microwave heating of the solid food. The pressure can be applied manually using a mechanical force or automatically using electrical energy for example. Pressure exerted on the solid food release the liquid syrup which flows down through the perforated lower plate (7) and also through the side grooves then outside the cavity in the final product container (11), to be finally collected through hollow pipe (9).

After extraction is completed, as described above, the container is emptied from the left date slurry after extraction, and clean washed for another extraction session. It is also desirable for the other parts of the apparatus to be clean washed after every use of the apparatus.

Also, dates could be pitted before press extraction if the left date after extraction is not to be used as a cash commodity. This helps in lessening the exerted pressure, as in this case, it will be applied on the pitted dates and not on the whole dates with stones. The amount of the dates to be extracted, and hence its height inside the container, should be kept to a minimum level in order to avoid excessive attenuation of microwave energy near the outer surface of the food and cause uneven heating of the dates. According to the tests performed in this invention, the best mode of operation could be with food height in the range of 7-8 cm. Similarly, the amount of pressure exerted will vary with the amount of food (dates) used, and it should be increased gradually as heating proceeds.

It was found, during experimentation with the invented apparatus, that application of full power lead to scorching and charring of dates due to excessive heating. Accordingly, it is preferable to apply moderately low power (about 70-75%), to avoid such problems. It was also found preferable to keep pressure exerted on Dates for an additional period of time, extending to 5 to 10 minutes depending on the amount of processed Dates, after switching power off to let extracted juice completely flow down to be collected.

The present apparatus, which gives a clean, efficient and quick method of thick syrup directly from fresh dates, can now be easily used by local date juice producers instead of the traditional technique which has many drawbacks.

The term food is intended to broadly encompass any food that may benefit from being simultaneously exposed to microwave energy and mechanical pressure; the invention being not limited to processing of dates. For example, the present apparatus can be used for curing of disk-shaped wood and plastic materials with adhesives, in batch processing. It can also be used for extraction of liquid juice from other plants, vegetables or fruits.

Alternatively, the present invention of the press extraction of date juice, can be incorporated in any side-fed commercial microwave oven, such as SANYO Model # EM-E1100S, which can be modified to allow insertion of the rod (12b) and consequently the plunger (12a), through the top ceiling, for exertion of mechanical pressure on the food to be processed inside the container (6) and an aperture drilled in the bottom side of the oven, to allow passage of the tubing that carries extracted juice to be collected in a juice container (11) placed under the bottom side of the resonator cavity (1).

Also, while the preferred embodiments of the present invention have been discussed herein, those skilled in the art will find that changes and modifications could be made therein, without departing from the spirit and the scope of this invention, as defined in and limited only by the scope of appended claims.

Although the above description of the present invention has disclosed the features of the invention as applied to the preferred embodiment; additions, omissions and modifications applied to the details of the embodiment illustrated may be made by those skilled in the art without departing from the essential characteristic of the present invention.

Although the invention has been explained in relation to its preferred embodiment, it is to be understood that many other possible modifications and variations can be made without departing from the spirit and scope of the invention as herein described.

The invention claimed is:

1. A press apparatus comprising:
   a microwave energy source;
   a resonator cavity adapted to receive microwave energy from the microwave energy source and to resonate the microwave energy within the resonator cavity, the resonator cavity having a peripheral side, a top side and a bottom side;
   a food container for receiving food from which juice is to be extracted, the container being adapted to be located within the resonator cavity for heating the food using the microwave energy, the food container having a peripheral side, a top side and a bottom side;
   a plunger adapted to press the food inside the food container;
   a press mechanism adapted to be located outside the resonator cavity and to be in force communication with the plunger for exerting mechanical pressure on the food inside the food container during the heating operation for extracting the juice; and
   a juice collector adapted to be located outside the resonator cavity in fluid communication with the container for collecting the juice.

2. The press apparatus as claimed in claim 1 further comprising at least one waveguide adapted to be connected to the microwave energy source and to the peripheral wall of the resonator cavity for guiding microwaves from the microwave energy source inside the resonator cavity for heating the food.

3. The press apparatus as claimed in claim 1 wherein the peripheral side of the container comprises a peripheral wall and a door for allowing insertion and removal of the food container inside and outside the resonator cavity respectively.

4. The press apparatus as claimed in claim 3 wherein at least a part of the door is made of transparent material and a matrix of conductive material for allowing viewing the food inside the container while preventing the microwave energy from leaking outside the resonator cavity.

5. The press apparatus as claimed in claim 1 further comprising an external enclosure adapted to enclose the microwave energy source, the resonator cavity, the food container and the juice collector.

6. The press apparatus as claimed in claim 1 wherein the resonator cavity is made of a highly conductive material for confining the microwave energy inside the resonator cavity.

7. The press apparatus as claimed in claim 1 wherein the container is made of a material having suitable electrical, mechanical and thermal properties for allowing penetration of the microwave energy from the resonator cavity inside the food container for heating the food, for withstanding without distortion the mechanical pressure exerted on the food by the plunger, and for withstanding without distortion the heat generated inside the container by the microwave energy.

8. The press apparatus as claimed in claim 7, wherein the container material comprises ceramic or polyetherimides with reinforced glass fibre.

9. The press apparatus as claimed in claim 1 wherein the press mechanism comprises a rod adapted to be connected to the plunger for enabling the force communication thereto.

10. The press apparatus as claimed in claim 9 wherein the press mechanism further comprises a spring in force communication with the plunger for allowing self-release of the pressure exerted on the food.

11. The press apparatus as claimed in claim 10 wherein the press mechanism further comprises a first hollow cylinder having a first cylinder axis, a closed top and an open bottom, a second hollow cylinder having a second cylinder axis, an open top and an open bottom adapted to slide within the first hollow cylinder along the first and second cylinder axis, the open bottom of the first cylinder and the open top of the second cylinder forming concentric openings, wherein the spring is adapted to enclose the rod, and wherein the rod and the spring are both adapted to extend longitudinally within the concentric openings of the first and second cylinders along the first and second cylinder axis and to have one end secured to the closed top of the first hollow cylinder.

12. The press apparatus as claimed in claim 11 wherein the top sides of the resonator cavity and of the food container have concentric openings adapted to allow passage of the rod inside the food container through the resonator cavity.

13. The press apparatus as claimed in claim 12 wherein the open bottom of the second hollow cylinder is adapted to be secured to the top side of the resonator cavity.

14. The press apparatus as claimed in claim 1 wherein the food container comprises an upper section adapted for receiving the food and a lower section adapted to canalize the extracted juice towards the juice collector, wherein the container upper section comprises a perforated lower end in fluid communication with the container lower section and wherein the container lower section is in fluid communication with the juice collector.

15. The press apparatus as claimed in claim 14, wherein the perforated lower end is a removable perforated plate.

16. The press apparatus as claimed in claim 15, wherein the container lower section comprises a conical portion in fluid communication with the container upper section and the juice collector for canalizing the juice from the container upper section to the juice collector.

17. The press apparatus as claimed in claim 16 wherein the container further comprises a perforated base adapted to be mechanically connected to the container lower section and adapted to stand on the resonator cavity bottom side, the base being in fluid communication with the container lower section and the juice collector for communicating the juice from the container lower section to the juice collector.

18. The press apparatus as claimed in claim 1, wherein the peripheral wall of the container is cylindrical.

19. The press apparatus as claimed in claim 1, wherein the food from which juice is to be extracted comprises at least one of vegetables, plants and fruits.

20. The press apparatus as claimed in claim 19 wherein the food from which juice is to be extracted is dates.

* * * * *